United States Patent [19]

Gilbert

[11] Patent Number: 4,919,525
[45] Date of Patent: Apr. 24, 1990

[54] BREAK-AWAY MIRROR MECHANISM

[75] Inventor: Robert Gilbert, Lonsdale, Australia

[73] Assignee: Britax Rainsfords Pty. Ltd., Lonsdale, Australia

[21] Appl. No.: 347,989

[22] Filed: May 5, 1989

[30] Foreign Application Priority Data

May 5, 1988 [AU] Australia ............................ PI8062

[51] Int. Cl.$^5$ .............................................. B60R 1/06
[52] U.S. Cl. .................................. 350/604; 350/632; 248/549; 248/479; 248/900
[58] Field of Search ...................... 350/604, 632, 635; 248/479, 486, 549, 900

[56] References Cited

U.S. PATENT DOCUMENTS

| 4,548,483 | 10/1985 | Moro et al. | 248/549 |
| 4,592,529 | 6/1986 | Suzuki | 248/900 |
| 4,679,758 | 7/1987 | Boddy et al. | 248/900 |

FOREIGN PATENT DOCUMENTS

| 0290234 | 11/1988 | European Pat. Off. | 350/635 |
| 2857558 | 7/1980 | Fed. Rep. of Germany | 350/635 |
| 0092132 | 5/1985 | Japan | 350/604 |
| 0116539 | 6/1985 | Japan | 350/604 |

Primary Examiner—Bruce Y. Arnold
Assistant Examiner—R. D. Shafer
Attorney, Agent, or Firm—Klauber & Jackson

[57] ABSTRACT

In this invention a motor vehicle rear vision mirror mounting bracket has a hinge member which stands out away from an outer face of the bracket, and a rear vision mirror assembly has lugs with notches which engage the hinge member and allow the mirror assembly to hinge without contact being made between the mirror case of the assembly and the mounting bracket, thereby avoiding scuffing of the mirror case.

5 Claims, 3 Drawing Sheets

BREAK-AWAY MIRROR MECHANISM

This invention relates to improvements in the mechanism of a rear vision mirror of a motor vehicle of the type wherein the mirror assembly is movable in either a forward or rearward direction upon impact for example so as to reduce accident hazard. Such mirrors are termed "break-away mirrors" in the trade. The invention is not limited to, but is particularly applicable to mirrors of the type described in our patent application entitled "Break-away Mirror Spring Means", the subject of Australian Patent Application No. 15542/88; U.S.A. 190012; Europe 88304024.8; and others.

BACKGROUND OF THE INVENTION

A number of difficulties are encountered in the design and construction of such mirrors. In order to satisfy styling requirements, the mirror cases are usually curved in both lateral and vertical planes, and hinging which takes place with most known mirrors tends to scuff the outer (polished) surface of the mirror case, particularly in a forward break-away movement, and further the mirror becomes unstable. One object of this invention is to provide an improvement whereby a mirror case can move through a forward break-away hinging movement, and remain stable during and after this break-away mode. The second object is to remain clear of the mounting bracket until the end of such movement, so that surface damage due to scuffing is unlikely to occur under most break-away conditions.

A third object of the invention is to ensure that the entire forwardly facing surface of the mirror case remains spaced from the bracket upon break-away. Thus, invention there is provided a pivot set outwardly from the mounting bracket of a mirror so that the pivotal axis is away from the bracket. With this arrangement, upon forward break-away the entire forwardly facing surface of the mirror case becomes spaced from the bracket, at least until the end of such movement.

Another problem which is encountered is that, in the past, there has been a requirement for close tolerances, which requirement therefore adds to production costs. This particularly applies when there are four contact points between the mirror case and the mounting bracket, so that two contact points exist during any break-away movement. If the contacts between these elements should be four in number when the mirror housing is in its viewing position, but due to inaccuracy only three contact points are made, the mirror case can be "loose" and vibrate.

In order to ensure that the mirror case will properly reset itself upon the break-away force being released, in an embodiment of the invention the mirror case is retained against the bracket by a spring means, and arranged so that the spring means cause engagement of three spaced points only so that a stable reseating is always available, notwithstanding liberal manufacturing tolerances. The more widely spaced the support points are of course, the stiffness achieved for retaining the mirror in its normal viewing position. Conveniently, a pair of vertically spaced projections (sometimes called stanchions in the trade) at the rearward end of the bracket can be associated with a single contact point at the front end of the bracket, and that contact point can, in the viewing position, be in contact with a ramp surface of the bracket which is however normally obscured from view, but upon hinging in a forward break-away direction, the forward end of the mirror mounting case is moved outwardly away from the bracket by the positioning of the hinge. This also has a further function of reducing the tendency of the mirror casing to vibrate under normal conditions, and enables the liberal tolerance to be used in the manufacture of the parts.

It is important that break-away both in forward and rearward directions should be as stable as possible, and in an embodiment of the invention the pivot can be constituted by a U-shaped wire (or a plastic molding equivalent thereto) projecting outwardly from the mounting bracket and engaged by spaced lugs on the mirror case which inhibit pivotal displacement in a vertical plane during the forward break-away movement. The spaced lugs also function to correctly reposition the mirror mounting case after it has returned from a rearward break-away position.

BRIEF SUMMARY OF THE INVENTION

In this invention a motor vehicle rear vision mirror mounting bracket has a hinge member which stands out away from an outer face of the bracket, and a rear vision mirror assembly has lugs with notches which engage the hinge member and allow the mirror assembly to hinge without contact being made between the mirror case of the assembly and the mounting bracket, thereby avoiding scuffing of the mirror case.

BRIEF DESCRIPTION OF THE DRAWINGS

An embodiment of the invention is described hereunder in some detail with reference to and is illustrated in the accompanying sketches in which.

DETAILED DESCRIPTION OF THE PREFERRED EMBODIMENTS

Figure 1:
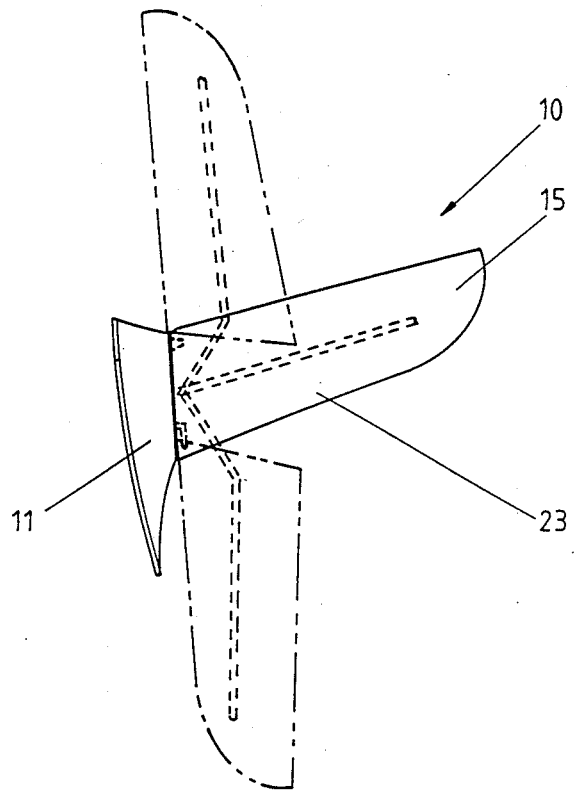
FIG. 1 is a plan view which illustrates the normal viewing position of a rear vision mirror, the rearward break-away position and the forward break-away position.
Figure 2:
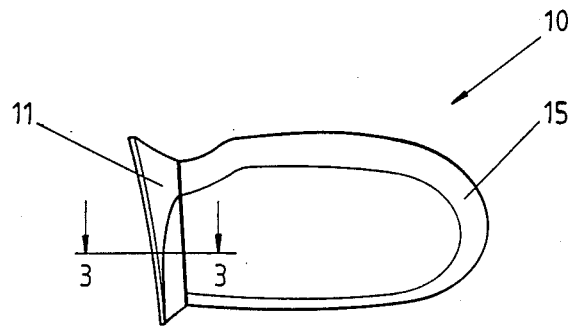
FIG. 2 is a front elevation of FIG. 1.
Figure 3:
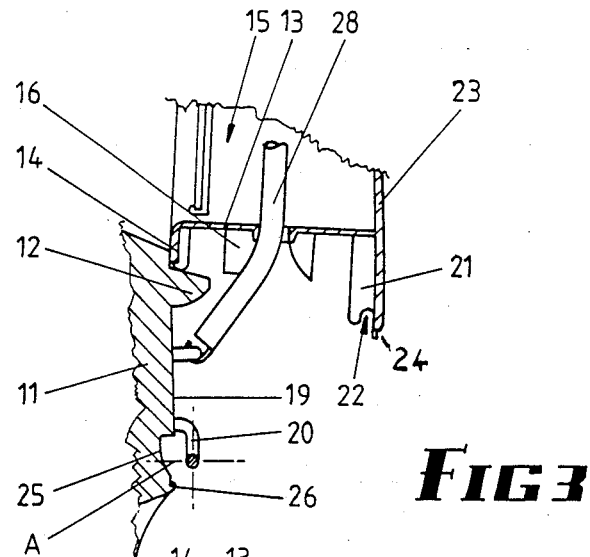
FIG. 3 is a section taken on line 3—3 of FIG. 2, showing the rearward break-away operation, FIG. 3 being drawn to a larger scale than FIGS. 1 and 2.
Figure 4:
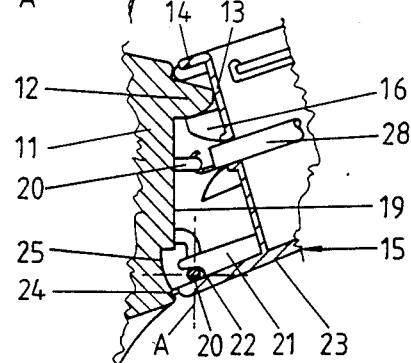
FIG. 4 is a view which corresponds to FIG. 3, but which shows the mechanism when the mirror is in the viewing position.
Figure 6:
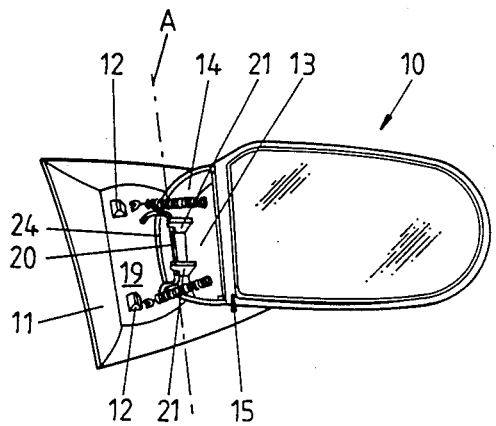
FIG. 6 is drawn to a smaller scale than FIGS. 3, 4 and 5, and shows the forward break-away position in elevation.
Figure 5:
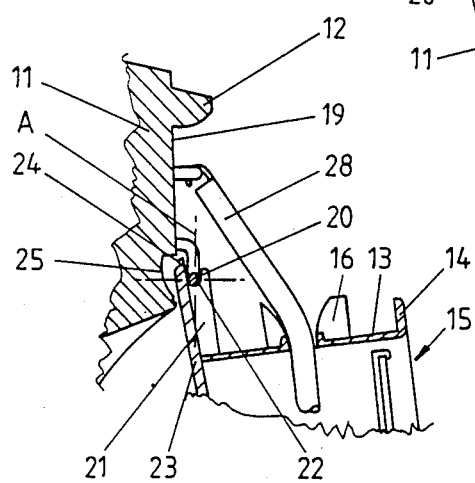
FIG. 5 shows the forward break-away movement.

In the first embodiment of FIGS. 1 to 6, a rear vision mirror assembly 10 is carried on a mounting bracket 11 for mounting externally on a motor vehicle, the mounting bracket 11 being provided with a pair of guide projections 12 constituted by two vertically spaced lugs near the rear edge of its outer face, as seen in FIG. 6. These projections in the normal viewing position of FIG. 4 engage locating webs 16, and a pair of pivoting surfaces 14 of the mirror mounting case 15. The surfaces engaged have such a slope that they tolerate considerable displacement from a normal position and yet reseat correctly. Upon rearward break-away (FIG. 3), there is an initial guidance by locating webs 16 projecting from the inner wall 13 of the mirror mounting case 15 which engage curved surfaces of the guide projections 12 and may be seen in FIG. 4. Further break-away to the maximum position takes place by a hinging movement between edges of the pivoting surfaces 14 and the projections 12. Vertical stability is achieved by the ends of the pivoting surfaces 14 as best seen in FIG. 6.

The bracket 11 has an outer face 19, and in order to provide hinging means for forward break-away which will not in any way mar the outer surface of the case, the bracket 11 carries a hinge member, being a U-shaped hinge wire 20 which projects outwardly from face 19 near its front edge, and is engaged by recesses or notches 22 in a pair of hinging lugs 21 Which constitute hinging means and project from the inner wall 13 of the mirror mounting case 15, and hinge about axis A which is spaced away from face 19, the surfaces of notches 22 engaging wire 20. Lugs 21 are so spaced from one another as to provide stability also in a vertical plane. The hinging axis A is further out from face 19 than from the inner edge of the front wall 23 of the case 15 so that as hinging takes place a clearance exists between the outer surface of the front wall 23 of the case 15 and the face 19 and it is this tolerance which avoids possible scuffing. When however the mirror case 15 returns to its viewing position (FIG. 4) a single support projection 24 on the inner edge of the front wall 23 rides up the ramp surface 25 and engages in a small, recess 26 (FIG. 3) near the end of that surface. Springs 28 effect this return. Thus the mirror again becomes supported on three points only, and is gradually led into the correct location. These two features eliminate the need for close tolerances which are presently used.

Figure 7:
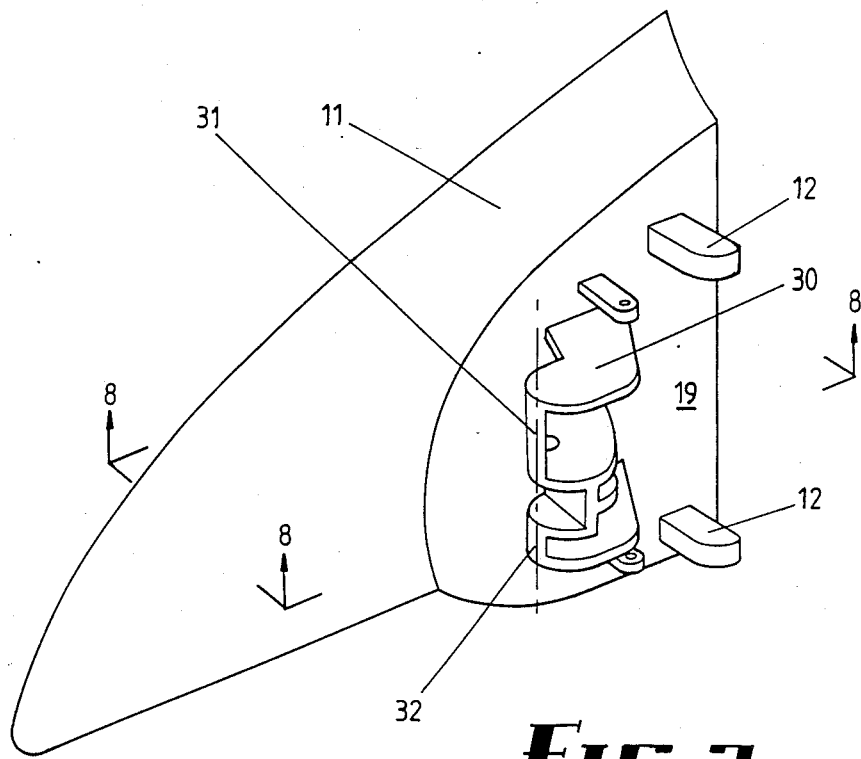
FIG. 7 is a perspective view of a mounting bracket which has a molded portion which performs the function of the pivot wire in the first embodiment.
Figure 8:
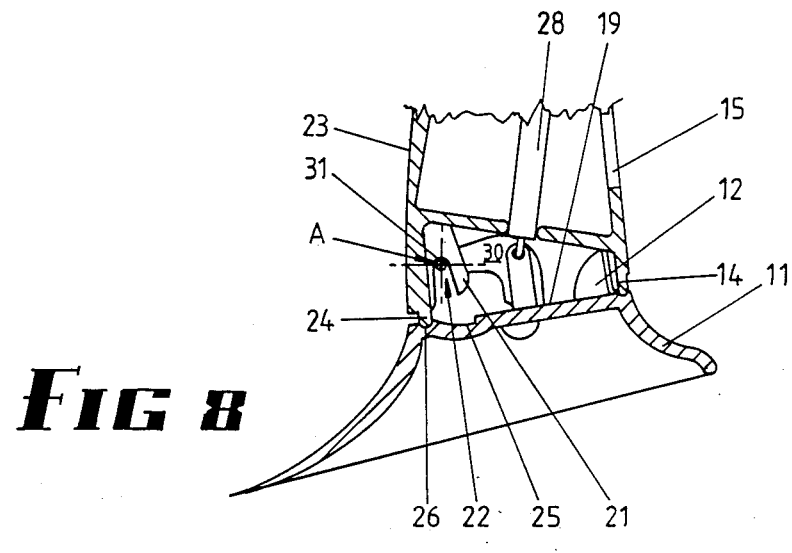
FIG. 8 is a fragmentary section of a mirror assembly on plane 8—8—8 of FIG. 7.

The second embodiment of FIGS. 7 and 8 is generally similar to the first, the main exception being that the hinge member in the first embodiment is a hinge wire 20, but in the second comprises a hinge bracket molding 30 having a pair of spaced co-axial molded hinge pins 31 and 32 which are engaged by respective notches 22 in lugs 21. In other respects, similar elements bear similar designations.

I claim:

1. A rear vision mirror of a motor vehicle, comprising:
   (a) a mounting bracket having:
      (i) an outer face with a front edge and a rear edge with respect to said vehicle,
      (ii) a pair of vertically spaced guide projections projecting from the outer face near said rear edge,
      (iii) a hinge member which has a hinging axis near said front edge and spaced outwardly away from the outer face, and
      (iv) a ramp surface adjacent the hinge member, and
   (b) a mirror assembly including a mirror case having:
      (i) a front wall with an inner surface and an outer surface, the front wall having a support projection which rides over the ramp surface upon forward break-away,
      (ii) hinging means adjacent said front wall inner surface, said hinging means having notches defined by surfaces thereof which engage over the hinge member, and
      (iii) pivoting surfaces so located as to engage said guide projections upon rearward break-away of the mirror assembly from the mounting bracket, wherein the mirror assembly breaks away from the mounting bracket upon impact, in a direction which is either forward or rearward with respect to the vehicle.

2. A rear vision mirror according to claim 1 wherein said ramp surface terminates in a recess near said front edge, and said support projection, upon return of the mirror assembly from its forward break-away position to a viewing position thereof, rides over the ramp surface and engages the recess,
   and further comprising a spring co-acting between the mounting bracket and the mirror case to cause the mirror in a viewing position thereof to bear against three spaced surfaces of the mounting bracket, two of said three surfaces being surfaces of the vertically spaced projections and the third being the surface of said recess.

3. A rear vision mirror according to claim 2 wherein said hinge member is a hinge wire, and said surfaces of said hinging means are so spaced with respect to said bracket so that said surfaces of said hinging means locate the mirror case in a vertical plane when the mirror is in the viewing position.

4. A rear vision mirror according to claim 2 wherein said hinge member is a hinge bracket molding having at least one molded hinge pin engaged by one said surface of said hinging means when the mirror is in a viewing position.

5. A rear vision mirror of a motor vehicle comprising:
   (a) a mounting bracket having:
      (i) an outer face with a front edge and a rear edge with respect to said vehicle,
      (ii) a pair of vertically spaced guide projections projecting from the outer face near said rear edge,
      (iii) a hinge member which has a hinging axis near said front edge and spaced outwardly away from the outer face,
   (b) a mirror assembly including a mirror case having:
      (i) an inner wall,
      (ii) locating webs on the inner wall,
      (iii) a front wall,
      (iv) hinging means adjacent said front wall, said hinging means having notches defined by surfaces thereof, and
      (v) a single support projection extending from the front wall, and
   (c) a spring co-acting between the mounting bracket and the mirror assembly which, when the mirror is in a viewing position, thereof, causes the inner wall to contact the guide projections and the support projection to bear against said outer face of the mounting bracket, thereby providing only three contact points between the mirror assembly and the mounting bracket, with said locating webs engaging surfaces of said guide projections and said notch surfaces engaging over said hinge member, wherein the mirror assembly breaks away from the mounting bracket upon impact, in a direction which is either forward or rearward with respect to the vehicle.

* * * * *